Aug. 24, 1926.
J. D. CROSSLEY
1,597,404
COLLET
Filed Sept. 12, 1925
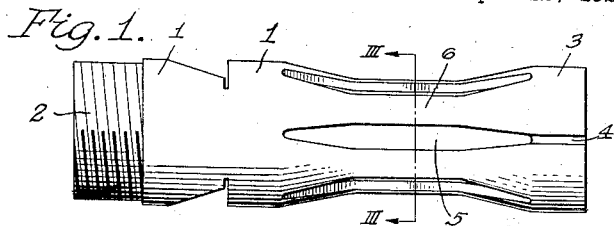
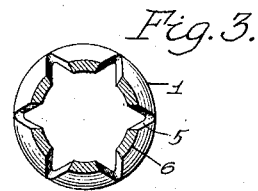
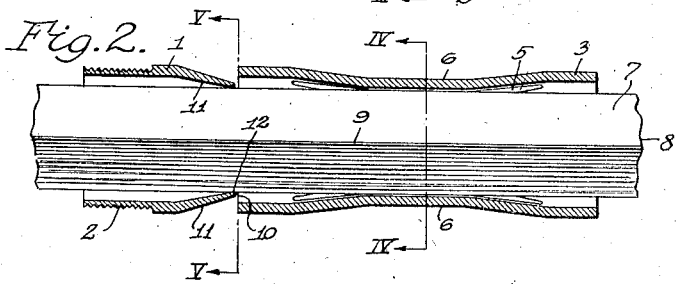
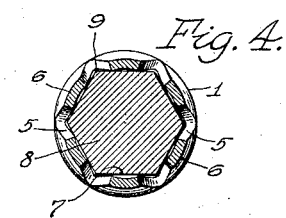
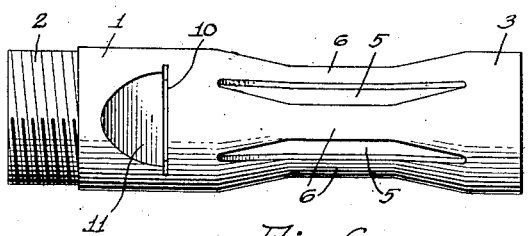
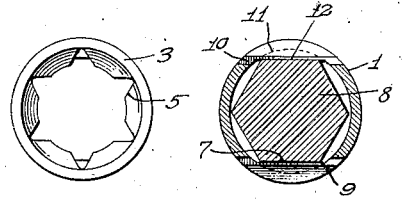
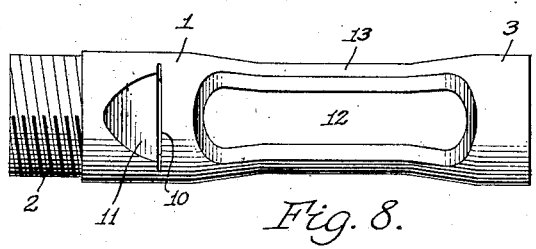
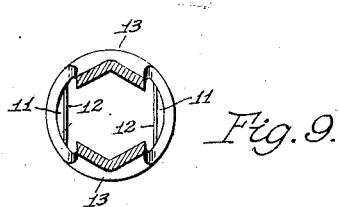
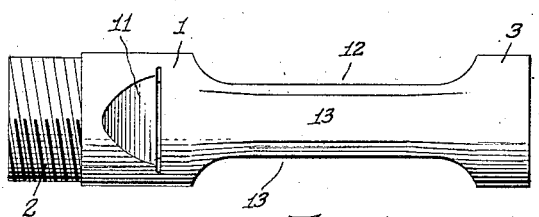
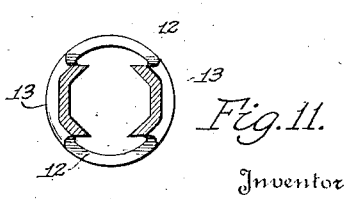
Inventor
Jesse D. Crossley,
By
Attorneys Patented Aug. 24, 1926.

1,597,404

UNITED STATES PATENT OFFICE.

JESSE D. CROSSLEY, OF DETROIT, MICHIGAN.

COLLET.

Application filed September 12, 1925. Serial No. 56,071.

In my Patent No. 1,438,021, dated December 5, 1922, there is disclosed a collet that may be advantageously used for gripping and shifting stock in connection with a single or multiple spindle automatic screw machine, in which a clutch, collet, gripping or feeding device automatically engages a piece of stock and intermittently advances the same, whereby pieces of the stock may be operated upon or used for various purposes. My patent is particularly directed to a new article of manufacture in the form of a hollow piece of material having inbent walls providing gripping members adapted to frictionally engage a piece of work between the gripping members, and this collet or clutch had its gripping members formed by longitudinally slotting the walls of the collet so that the material between the slots could be bent inwardly to provide the gripping members.

The collet is especially designed for feeding stock hexagonal or octagonal in cross section, and it has been found in actual practice that now and then a collet is injured by having a piece of stock forced therein, with the result that the gripping members are excessively sprung, weakened or even set so that the gripping members will no longer function for stock feeding purposes. If a piece of stock is properly inserted in the collet the gripping members engage the facets of the piece of stock and the slots between the gripping members provide clearance for the angles or corners formed by the facets of the piece of stock. But, sometimes the piece of stock is inserted wrongly, with the angles or corners impinging against the gripping members and forcing the same outwardly to such an extent that the gripping members are unduly sprung and therefore have the resiliency thereof decreased, in time, for properly gripping the facets of a piece of stock.

To prevent a piece of stock from being wrongly placed in a collet or like device is the purpose of this invention, and the means which I employ to insure a correct position and entrance of a piece of stock is applicable to various types of collets or feeding devices. Briefly, the means consist of opposed lips instruck from a collet with the lips so rigid that a wrongly positioned piece of stock cannot be forced between the lips, therefore it becomes necessary for a piece of stock to be correctly positioned relative to the lips, with the result that it is correctly positioned relative to the gripping members of the collet.

My invention will be hereinafter specifically described and then claimed, and reference will now be had to the drawing, wherein—

Figure 1 is a side elevation of a collet in accordance with this invention;

Fig. 2 is a longitudinal sectional view of the same;

Fig. 3 is a cross sectional view taken on the line III—III, Figure 1;

Fig. 4 is a similar view taken on the line IV—IV, Figure 2;

Fig. 5 is a similar view taken on the line V—V of Figure 2;

Figure 6 is a plan of another form of collet in accordance with this invention;

Fig. 7 is an end view of the same;

Fig. 8 is a plan of another form of collet;

Fig. 9 is a cross sectional view of the same;

Fig. 10 is a plan of still another form of collet, and

Fig. 11 is a cross sectional view of the same.

Reference will first be had to Figures 1 to 5 inclusive, showing a collet made from a single piece of tubular material having a rigid inner end portion 1 exteriorly screw-threaded, as at 2, so that it may be attached to the pusher sleeve or other operation member of an automatic machine. The collet has an outer end portion 3 that may be longitudinally slotted, as at 4, or it may provide an uninterrupted circumferential wall, as shown in Figures 6, 8 and 10. Instead of a single slot, as shown in Figure 1, there may be a plurality of slots providing a well known form of collet, including a multiplicity of gripping fingers.

Between the inner and outer end portions 1 and 3, there are a plurality of longitudinal slots 5, and the material between said slots is inbent to form a plurality of longitudinally disposed resilient gripping members 6 which are adapted to engage the facets 7 of a piece of stock 8 extending through the collet. As shown in Figure 4, the slots 5 provide clearance for the angles or corners 9 formed by the facets 7 of the piece of stock and the relation of the piece of stock to the collet, as shown in Figure 4, is correct. As set forth in the beginning, this relation is not always maintained because at times the piece of stock is inserted with its corners or angles 9 bearing against the gripping members 6 to the extent that said members are excessively sprung. To prevent this, I provide the inner end portion 1 of the collet with transverse slits 10, which are in opposed relation, as best shown in Figures 1 and 2. The material between the slits 10 and the threaded end of the collet is inbent to provide rigid lips 11, said lips presenting transverse straight parallel edges 12. With these lips comparatively rigid it is only possible to insert the piece of stock 8 in the collet correctly, that is, with the opposed facets 7 of the piece of stock engaging the opposed lips 11. Then, the angles or corners of the piece of stock will be correctly positioned relative to the slots 5 of the collet. It being only possible to insert the piece of stock in a defined way in the collet prevents the gripping member 6 from being excessively sprung and worn.

Figures 8 to 11 inclusive show the lips 11 in connection with other forms of collets, particularly a collet having opposed longitudinal openings 12 and opposed longitudinal gripping members 13.

I attach considerable importance to the fact that the lips 11 constitute means for correctly positioning a piece of stock relative to the collet and that said means is at the inner end of the collet and consequently precludes any injury to the gripping members of the collet, whether the same be intermediate the ends of the collet or at the outer end thereof.

While in the drawing there are illustrated the preferred embodiments of my invention, it is to be understood that my invention is susceptible to such changes as are permissible by the appended claims.

What I claim is:—

1. As a new article of manufacture, a collet having stock engaging faces and its inner end provided with transverse slits with the material adjacent said slits bent inwardly to provide lips adapted to correctly position a piece of stock for engagement by the stock engaging faces of the collet.

2. A collet comprising a tubular piece of material provided with longitudinal slots with the material between said slots inbent to form gripping members, and lips at the inner end of said collet adapted to correctly guide a piece of stock for engagement by said gripping members.

In testimony whereof I affix my signature.

JESSE D. CROSSLEY.